United States Patent [19]
Shovan et al.

[11] Patent Number: 5,926,274
[45] Date of Patent: Jul. 20, 1999

[54] VERY LOW EXPANSION RADIATION HARDENED TRANSMISSION MEDIUM

[75] Inventors: Ronald W. Shovan, Clearwater, Fla.; Steven C. Albers, Coon Rapids; Timothy J. Callaghan, Roseville, both of Minn.

[73] Assignee: Honeywell Inc., Minneapolis, Minn.

[21] Appl. No.: 08/812,614

[22] Filed: Mar. 6, 1997

[51] Int. Cl.⁶ .................................................. G01C 19/66

[52] U.S. Cl. ............................................ 356/350; 372/94

[58] Field of Search ............................... 356/350; 372/94

[56] References Cited

U.S. PATENT DOCUMENTS

| | | | |
|---|---|---|---|
| 4,666,247 | 5/1987 | MacChesney et al. | 385/142 |
| 5,059,029 | 10/1991 | Bergstrom | 356/350 |
| 5,404,007 | 4/1995 | Hotaling | 356/350 X |
| 5,469,256 | 11/1995 | Hall et al. | 356/350 |

*Primary Examiner*—Samuel A. Turner
*Attorney, Agent, or Firm*—Albert K. Kau; Robert E. Greenstien

[57] ABSTRACT

A output mirror with a substrate that is doped with a radiation stabilizing material is used to reduce the adverse effects of long periods of exposure to radiation. The output mirror is capable of maintaining its transmissive characteristics when exposed to radiation and is used in radiation environments.

4 Claims, 3 Drawing Sheets

VERY LOW EXPANSION RADIATION HARDENED TRANSMISSION MEDIUM

BACKGROUND OF THE INVENTION

The present invention relates to angular rate sensors for sensing rotation in inertial space. More specifically the invention relates to ring laser gyroscopes which operate in radiation environments.

Ring laser gyroscopes are used as inertial sensors in many applications including all types of navigation systems. Generally speaking, ring laser gyroscopes operate by supporting two counterpropagating optical signals within a closed loop path. An ultrastable block containing a closed loop cavity is used to support the counterpropagating optical signals. As this block is rotated, a frequency separation is created between the two optical signals which is indicative of rotation. This separation is then detected and used as a measurement of inertial rotation.

The two optical signals are generally created by generating a gas discharge laser within a cavity. One type of gas discharge laser is helium-neon laser. The helium-neon laser operates by electrically exciting a mixture of helium and neon gas. This excitation creates photo emission, thus producing optical signals. The optical signals are caused to resonate within the aforementioned cavity by placing highly reflective mirrors at the corners to create a closed path. Due to the arrangement of electrodes and the design of the cavity, two optical signals are created, each propagating in opposite directions around the closed loop path.

At one corner of the block there is positioned a partially transmissive mirror which allows a portion of the optical signals to escape from the cavity while the remainder of the optical signals are reflected. This mirror is commonly known as the output mirror because of its having the appropriate output sensors associated therewith. In operation, a portion of each optical signal is allowed to escape from the cavity and subsequently be combined with the other optical signal to sense the aforementioned frequency separation.

The amount of transmission and the amount of reflection are chosen for the output mirror based upon the necessary signal strengths and laser power levels.

Due to the criticality of the two optical signals, it is very important to create a very stable closed loop path. Generally this is accomplished by controlling the thermal expansion characteristics of the block and all related elements (e.g., the mirrors). Materials are chosen for the block which have very low coefficients of thermal expansion, such as Zerodur (a glass produced by Schott Glass Technologies of Duryea, Pa.) or BK-7 (also produced by Schott Glass Technologies of Duryea, Pa.). Similarly, the mirrors must be produced to be very stable over temperature changes.

In the operation of the ring laser gyroscope, the performance of the mirrors creating the closed loop optical path is critical. As previously mentioned, one of these mirrors is the output mirror which must have very stable optical characteristics. Included in the characteristics for the output mirror are reflectance/transmission ratios, the scattering characteristics, and degradation over time.

In addition to the necessary optical characteristics, the output mirror must also meet numerous other design attributes. First, the output mirror must have thermal expansion characteristics which closely match the thermal characteristics of the block. This thermal matching avoids errors in the gyro due to incompatible thermal expansion. Secondly, the output mirror must be capable of being sealed to the block so as to form a gas tight seal. Lastly, the output mirror must have the necessary Helium diffusion characteristic. As previously mentioned, the laser is created using a mixture of helium and neon within a closed loop cavity. To insure consistent operation over time, the cavity must be capable of maintaining constant gas mixtures and pressures. This is a concern because of the knowledge that certain materials allow helium gas to escape through the materials lattice structure. Therefore, it is necessary to utilize materials that have very low helium diffusion characteristics. Examples of material used as substrates in the construction of ring laser gyro output mirrors includes glasses (Zerodur and BK-7), and fused silica quartz. Many of the aforementioned characteristics are desirable for all mirrors on the gyroscope, however the present invention is primarily concerned with the output mirrors only.

By meeting all of the aforementioned, the gyro is assured to operate very accurately, assuming all other necessary systems are operating effectively. Other systems are well known in the art and are beyond the scope of the present invention.

Complications arise, however, when the gyroscope is operated in a radiation environment. The exposure to radiation is a concern since the ring laser gyroscope is used in natural space, weapons enhanced space, strategic and tactical weapons environments. Radiation has numerous effects on the operation of the gyro, some of which are detrimental to the gyro's operation. More specifically, radiation causes the darkening of numerous glass type materials, including the darkening of the output mirrors as they are exposed to radiation. The net result of the exposure to radiation, generally speaking, is a lowering of the optical characteristics of the mirrors. More specifically, the transmission characteristics of the glass materials is greatly reduced causing a reduction in the strength of the signals being transmitted by the mirror to the output sensors.

As previously discussed, the characteristics of the output mirror is critical to the operation of the gyroscope, therefore it is necessary to make alterations and adjustments to the output mirror to accommodate operation in radiation environments. Currently, there does not exist a output mirror that will withstand the levels of radiation expected while also demonstrating the attributes necessary for optimum gyroscope performance.

Another problem that affects the operation of the output mirror is the glow that exists in the closed loop cavity of the ring laser gyroscope. The glow is a by-product created by the gas discharge within the cavity. Glow is undesirable since it creates a DC offset component in the output signals. This DC component corrupts the true laser power and the output signal processing and represents a false reading to the output sensors. As a result, the dynamic range of the output signal processing is reduced along with a reduction of the useful input voltage range for the signals.

SUMMARY OF THE INVENTION

An object of the present invention is to provide a radiation hardened output mirror in a ring laser gyroscope so that the gyroscope can operate in a radiation environment without optical degradation.

According to the present invention the output mirror in a ring laser gyroscope is doped with a radiation stabilizing material comprising Cerium and Iron or Cerium and Niobium.

A feature of the present invention is that an output mirror can attenuate glow discharge effects in the gyroscope output sensors.

DETAILED DESCRIPTION OF THE PREFERRED EMBODIMENT

Figure 1:
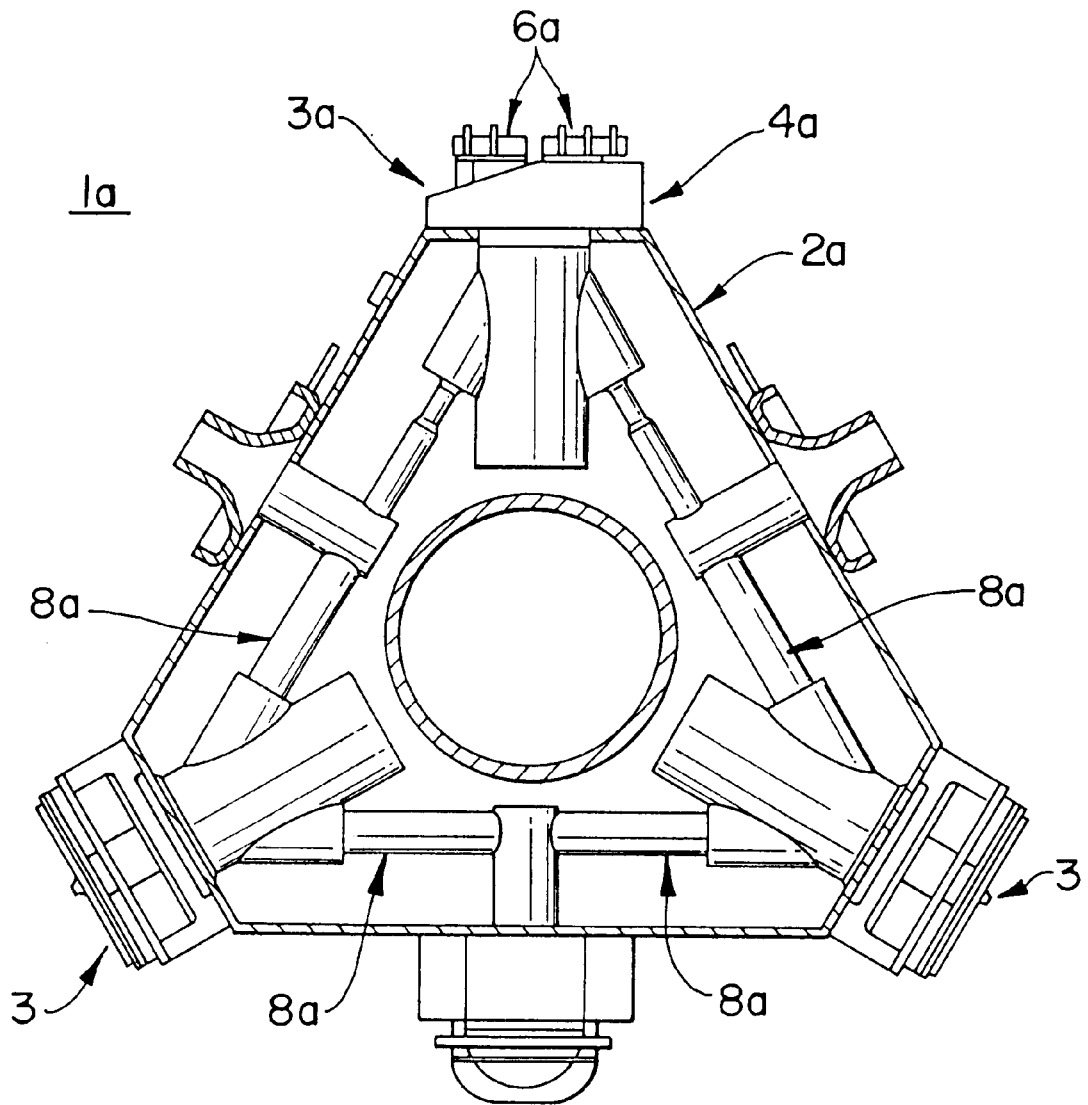
FIG. 1 shows a top view of a ring laser gyro.

FIG. 1 shows a ring laser gyro 1a used with the present invention. The ring laser gyro 1 includes a ring laser gyro block 2a with mirrors 3, 3a. The substrate 4a of the output mirror 3a is made of a Cerium, or Cerium in combination with other elements such as Niobium, Iron, etc., doped Zerodur and includes output sensors 6a mounted on top of the output mirror 3a.

The ring laser gyro has gas laser discharge tubes 8a in the ring laser gyro block 2a. These tubes 8a contain light beams. Light beams moving in a counter clockwise direction are reflected off of the mirrors 3 onto and through the output mirror 3a. This light beam is then detected by the output sensors 6a. A light beam moving in the clockwise direction is initially reflected off the output mirror 3a and onto the other mirrors 3. A portion of this clockwise light beam is transmitted through the output mirror 3a and then to the output sensors 6a where the clockwise and the counterclockwise rotating light beams are compared and mixed. The mixing of these counter rotating light beams produces a frequency which is measurable and representative of angular rotation experienced by the ring laser gyro 1.

Currently, the optical transmission of the material used in the substrate 4a in the output mirror 3a decreases when the mirror 3a is exposed to ionizing radiation in space environments. In the preferred embodiment, a material is used to minimize radiation induced transmission loss. This material is Cerium ($CeO_2$) doped Zerodur. In a preferred embodiment, the doping is 0.1% $Fe_2O_3$ and 1% $CeO_2$. In this manner, the radiation induced transmission loss in the output mirror 3a is minimized.

Another problem the present invention solves is the problem of glow that was mentioned above in the background of the invention. The material that the substrate 4a is made of reduces glow in ring laser gyros by creating color centers to absorb the glow which is similar to effect of tinted windows. When the output signals are obtained from the output sensors 6a, the glow is reduced. The reduction of glow power is in the wavelength bands of approximately 300–500 nm and 700 nm to 1,000 nm. For example, a doping level of around 0.5% Ce gives 46% reduction in glow transmission, but any percentage doping can be used to achieve glow reduction.

Figure 2:
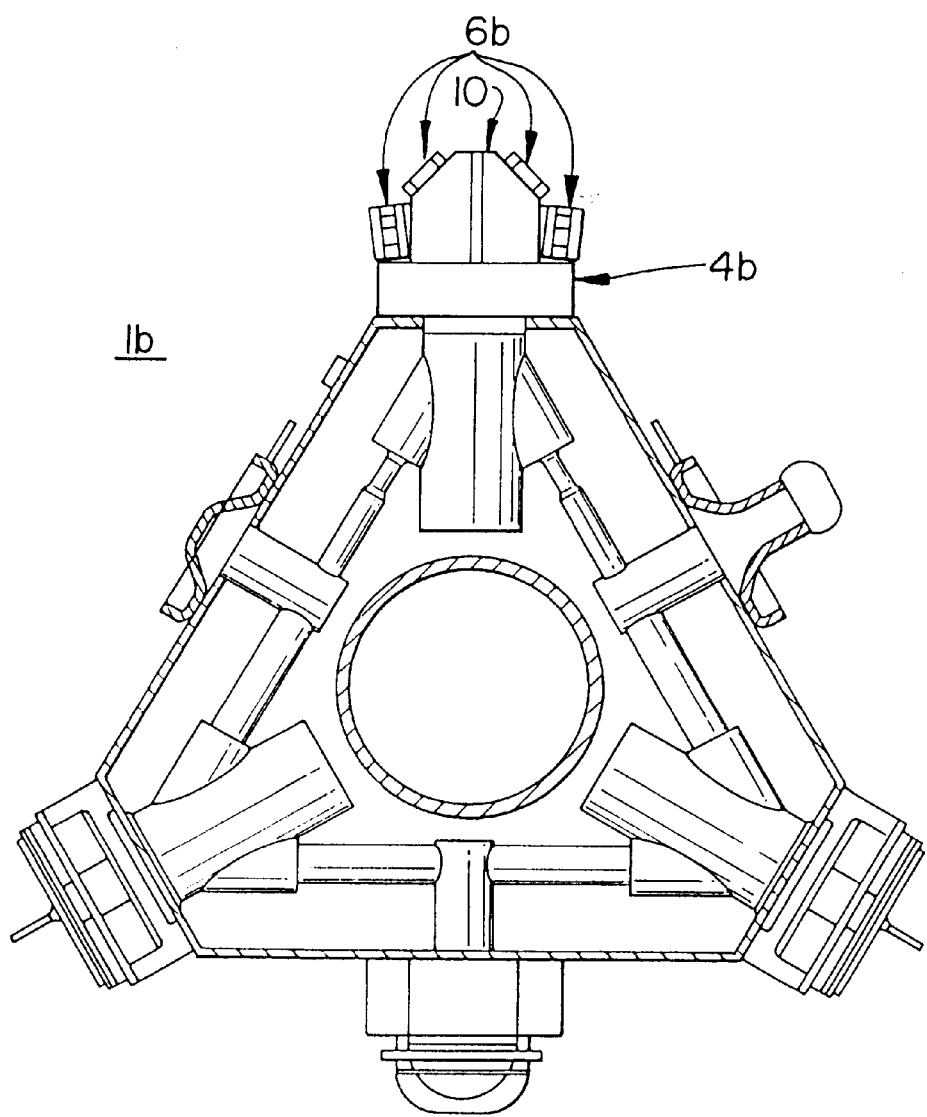
FIG. 2 shows another embodiment of the present invention used in a laser gyro.

FIG. 2 shows another embodiment of the present invention in which the structure is different. In this embodiment, four output sensors 6b are used which are placed on a output combiner prism 10. This combination is then placed on the substrate 4b which is described before. The substrate is made of the same material as described before and operates in the same manner. The material optimizes transmission and reduces glow as mentioned above.

Figure 3:
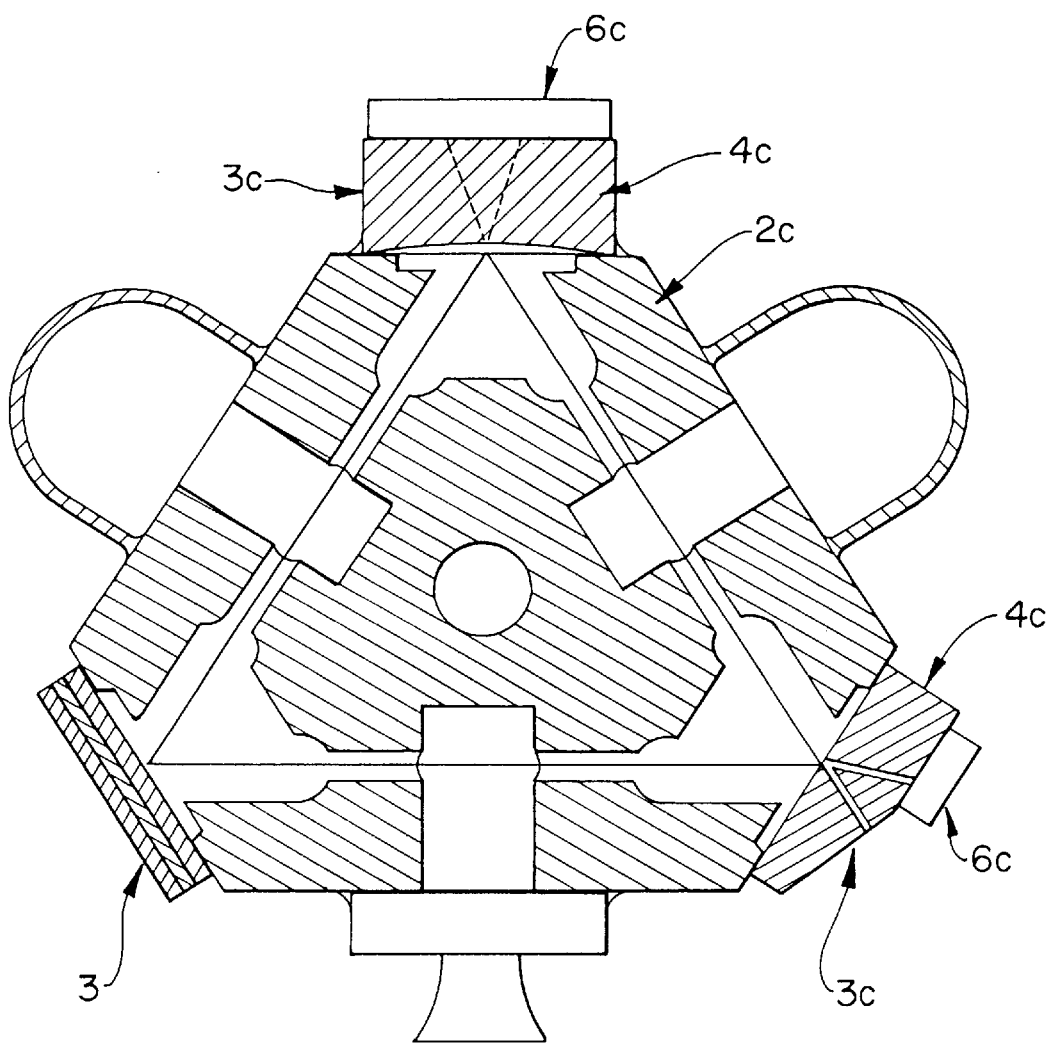
FIG. 3 shows another embodiment of the present invention used in a laser gyro of frit seal technology.

FIG. 3 shows another embodiment of the present invention. The present invention is also compatible with a mirror substrate 4c incorporated in "glass" frit seal technology in which the mirror substrate 4c is frit sealed onto the block 2c. The frit seal technology ring laser gyro is similar to the ring laser gyro mentioned above except for some structural differences. A first structural difference is that BK7 substrate is used. Another structural difference, as can be seen in the figure, is that the output sensors 6c are placed on two mirrors 3c instead of one. Therefore, two of the mirrors 3c of the laser gyro 1c use BK7 substrate doped with 1.8% Cerium ($CeO_2$). Again this material used in the mirror substrates 4c reduces the radiation induced optical transmission loss at high ionizing dose levels.

The embodiments of the invention in which an exclusive property or right is claimed are defined as follows:

1. A laser gyro, having laser beams, capable of operating in radiation environments for exended periods of time comprising:

a laser gyro block with a plurality of sides and a plurality of ends having optical signals propagating within the laser gyro block;

plurality of connected to the ends of the laser gyro block, the mirrors reflecting the optical signals as the optical signals propagate to each end;

at least one output mirror, which is one of the plurality of mirrors, made of a radiation stabilizing material that partially reflects the optical signals and partially transmits the optical signals out of the output mirror, said stabilizing material comprising Cerium in combination with Iron; and output apparatus adjacent to the output mirror, the output apparatus receiving the optical signals transmitted by the output mirror and producing a signal indicative of rotation of a property of the laser beams in the laser gyro block.

2. The laser gyro of claim 1 wherein the radiation stabilizing material is Cerium in combination with Niobium.

3. A partially reflective mirror for reflecting a portion of optical signals which intersect a reflection surface and for transmitting the remaining portion of the optical signals which intersect the reflection surface, comprising:

a mirror substrate made of ultra low thermal expansion material doped with a radiation stabilizing material having a substantially constant transmission loss characteristic when exposed to radiation environments, the substrate having a transmission surface and a reflective surface, said stabilizing material comprising Cerium in combination with Iron; and a partially reflective film attached to the reflective surface of the substrate for allowing a portion of the optical signals intersecting the film to be reflected while a remaining portion of the optical signal is transmitted.

4. The laser gyro of claim 3 wherein the radiation stabilizing material is Cerium in combination with Niobium.

* * * * *